US009832369B2

(12) United States Patent
Oyman et al.

(10) Patent No.: US 9,832,369 B2
(45) Date of Patent: *Nov. 28, 2017

(54) INTERACTIVE VIDEO CONFERENCING

(71) Applicant: INTEL CORPORATION, Santa, CA (US)

(72) Inventors: Ozgur Oyman, San Jose, CA (US); Jean-Pierre Giacalone, Sophia-Antipolis (FR); Ivan Fox, Valbonne (FR)

(73) Assignee: Intel Corporation, Santa Clara, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/365,746

(22) Filed: Nov. 30, 2016

(65) Prior Publication Data

US 2017/0085782 A1    Mar. 23, 2017

Related U.S. Application Data

(63) Continuation of application No. 14/704,437, filed on May 5, 2015, now Pat. No. 9,516,220.
(Continued)

(51) Int. Cl.
*H04N 7/14* (2006.01)
*H04N 5/232* (2006.01)
(Continued)

(52) U.S. Cl.
CPC ........... *H04N 5/23216* (2013.01); *G06K 9/46* (2013.01); *H04L 65/1009* (2013.01);
(Continued)

(58) Field of Classification Search
CPC ...................................................... H04N 7/14
(Continued)

(56) References Cited

U.S. PATENT DOCUMENTS 6,496,607 B1   12/2002   Krishnamurthy et al.
7,321,384 B1 *  1/2008   Wu .................... H04N 7/152
                                                       348/14.08
(Continued)

FOREIGN PATENT DOCUMENTS

EP            2343879 A1    7/2011
KR    10-2009-0026781 A1    1/2009
(Continued)

OTHER PUBLICATIONS

3GPP TS 26.114, "IP Multimedia Telephony; Media handling and interaction", Jun. 2011, 240 pages, Version 11.0.0, Release 11.
(Continued)

*Primary Examiner* — Olisa Anwah
(74) *Attorney, Agent, or Firm* — Thorpe North & Western

(57) ABSTRACT

Technology for a local user equipment (UE) operable to perform video conferencing with a remote UE is disclosed. The local UE can define a region of interest (ROI) within a field of view of a camera of the remote UE. The local UE can map the ROI to one or more pan, tilt, zoom and focus (PTZF) commands. The local UE can send the one or more PTZF commands to the remote UE, wherein the remote UE is configured to identify the ROI based on the one or more PTZF commands. The local UE can receive encoded video within the ROI from the remote UE. The encoded video can include the regions within the ROI at an increased zoom level while substantially maintaining a defined quality level to enable the encoded video within the ROI to be rendered and displayed at the local UE.

20 Claims, 13 Drawing Sheets

Related U.S. Application Data

(60) Provisional application No. 62/059,025, filed on Oct. 2, 2014.

(51) Int. Cl.
*H04N 19/167* (2014.01)
*G06K 9/46* (2006.01)
*H04N 7/15* (2006.01)
*H04L 29/06* (2006.01)

(52) U.S. Cl.
CPC ........ *H04L 65/4053* (2013.01); *H04L 65/608* (2013.01); *H04N 5/232* (2013.01); *H04N 5/23206* (2013.01); *H04N 5/23222* (2013.01); *H04N 5/23293* (2013.01); *H04N 5/23296* (2013.01); *H04N 7/147* (2013.01); *H04N 7/15* (2013.01); *H04N 19/167* (2014.11); *G06K 2009/4666* (2013.01)

(58) Field of Classification Search
USPC ............................... 348/14.01, 14.03, 14.05
See application file for complete search history.

(56) References Cited

U.S. PATENT DOCUMENTS

| | | | |
|---|---|---|---|
| 8,970,653 B2* | 3/2015 | Bowen | H04N 7/15 348/14.03 |
| 9,307,192 B2* | 4/2016 | Oyman | H04W 36/0066 |
| 2006/0215752 A1 | 9/2006 | Lee et al. | |
| 2006/0215753 A1 | 9/2006 | Lee et al. | |
| 2006/0215766 A1 | 9/2006 | Wang et al. | |
| 2006/0238445 A1 | 10/2006 | Wang et al. | |
| 2007/0076957 A1 | 4/2007 | Wang et al. | |
| 2010/0026781 A1 | 2/2010 | Ali et al. | |
| 2010/0103245 A1 | 4/2010 | Decker et al. | |
| 2010/0118111 A1 | 5/2010 | Bouazizi | |
| 2011/0085016 A1 | 4/2011 | Kristiansen et al. | |
| 2011/0205333 A1 | 8/2011 | Wu et al. | |
| 2011/0249074 A1 | 10/2011 | Cranfill et al. | |
| 2012/0320141 A1 | 12/2012 | Bowen et al. | |
| 2013/0155182 A1 | 6/2013 | Bekiares et al. | |
| 2013/0246846 A1 | 9/2013 | Oyman | |
| 2013/0275615 A1 | 10/2013 | Oyman | |
| 2014/0078241 A1 | 3/2014 | Vaisburd et al. | |
| 2014/0079118 A1 | 3/2014 | Dedeoglu et al. | |
| 2014/0079126 A1 | 3/2014 | Ye et al. | |
| 2014/0320587 A1 | 10/2014 | Oyman | |
| 2014/0359652 A1 | 12/2014 | Ghorbel et al. | |
| 2015/0195490 A1 | 7/2015 | Oyman | |
| 2015/0334152 A1 | 11/2015 | Oyman | |
| 2016/0044099 A1 | 2/2016 | Oyman | |
| 2016/0100099 A1 | 4/2016 | Oyman et al. | |
| 2016/0165185 A1 | 6/2016 | Oyman | |

FOREIGN PATENT DOCUMENTS

| | | |
|---|---|---|
| KR | 10-2009-0020421 A | 2/2009 |
| TW | 201303786 A | 1/2013 |
| WO | WO 2014/176087 A1 | 10/2014 |

OTHER PUBLICATIONS

3GPP TS 26.140, "Multimedia Messaging Service (MMS); Media formats and codecs", Mar. 2012, 13 pages, Version 11.0.0 Release 11.

3GPP TS 26.244, "Transparent end-to-end packet switched streaming service (PSS); 3GPP file format (3GP)", Jun. 2012, 58 pages, Version 11.0.0, Release 11.

3GPP TS 26.247, "Transparent end-to-end Packet-switched Streaming Service (PSS); Progressive Download and Dynamic Adaptive Streaming over HTTP (3GP-DASH)", Sep. 2012, 112 pages, Version 11.0.0, Release 11.

3GPP TS 26.346, "Multimedia Broadcast/Multicast Service (MBMS); Protocols and codecs", Mar. 2012, 163 pages, Version 11.0.0, Release 11.

Intel, "ROI Permanent Document—Requirements, Working Assumptions and Potential Solutions", 3GPP TSG-SA4 S4-140975 (revision of S4-140820), Version 0.3, Agenda 11.7, Meeting 80, 5 pages, Aug. 2014, San Francisco, CA, USA.

Intel, "ROI Permanent Document—Requirements, Working Assumptions and Potential Solutions", 3GPP TSG-SA4 S4-150446, Version 1.1.0, Agenda 10.5.4, Meeting 83, 14 pages, Apr. 2015, Bratislava, Slovakia.

ITU-T H.282, "Remote device control protocol for multimedia applications", Series H: Audiovisual and Multimedia Systems, May 1999, 23 pages.

Ott et al, "Extended RTP Profile for Real-time Transport Control Protocol (RTCP)-Based Feedback (RTP/AVPF)", Network Working Group Request for Comments: 4585, Jul. 2006, 52 pages.

Polycom, "H.FEMC: Proposed updates", Telecommunication Standardization Sector COM 16-C 332 R1-E, Study Group 16—Contribution 332 R1, Oct. 2013, 97 pages.

Singer, "A General Mechanism for RTP Header Extensions", Network Working Group Request for Comments: 5285, Jul. 2008, 18 pages.

Extended European search report for European Application No. 15733222.2 filed Jan. 6, 2015; dated Jul. 4, 2017: 15 pages.

* cited by examiner

SDP Offer Indicating Enhanced FECC

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=extmap:4 urn:3gpp:efecc
```

FIG. 5A

SDP Answer Accepting Enhanced FECC

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
      sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=extmap:4 urn:3gpp:efecc
```

FIG. 5B

SDP Offer Indicating Enhanced FECC

```
m=video 49154 RTP/AVP 99
a=tcap:1 RTP/AVPF
a=pcfg:1 t=1
b=AS:315
b=RS:0
b=RR:2500
a=rtpmap:99 H264/90000
a=fmtp:99 packetization-mode=0; profile-level-id=42e00c; \
    sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-efecc
```

FIG. 6A

SDP Answer Accepting Enhanced FECC

```
m=video 49154 RTP/AVPF 99
a=acfg:1 t=1
b=AS:315
b=RS:0
b=RR:2500
a=rtpmap:99 H264/90000
a=fmtp:99 packetization-mode=0; profile-level-id=42e00c; \
     sprop-parameter-sets=J0LgDJWgUH6Af1A=,KM46gA==
a=imageattr:99 send [x=320,y=240] [x=240,y=320] recv [x=320,y=240]
[x=240,y=320]
a=rtcp-fb:* trr-int 5000
a=rtcp-fb:* nack
a=rtcp-fb:* nack pli
a=rtcp-fb:* ccm fir
a=rtcp-fb:* ccm tmmbr
a=rtcp-fb:* 3gpp-efecc
```

FIG. 6B

INTERACTIVE VIDEO CONFERENCING

RELATED APPLICATIONS

This application is a continuation of U.S. patent application Ser. No. 14/704,437 filed May 5, 2015, which claims priority to U.S. Provisional Patent Application No. 62/059,025, filed Oct. 2, 2014, the entire specification of which is hereby incorporated by reference in its entirety for all purposes.

BACKGROUND

The growth of multimedia services, including streaming and conversational services, is one of the key drivers of the evolution to new mobile broadband technologies and standards. Digital video content is increasingly consumed in mobile devices. There are many video applications extensively used on mobile devices in daily life. For example, online video streaming include popular services such as YouTube and Hulu. Video recording and video conferencing include services such as Skype and Google Hangout. In 2011, YouTube had more than 1 trillion global views. Ten percent of the views were accessed via mobile phones or tablets. As more smart phones, tablets, and other mobile computing devices are purchased, their use for video recording and video conferencing will increase dramatically. With such high consumer demand for multimedia services coupled with developments in media compression and wireless network infrastructures, it is of interest to enhance the multimedia service capabilities of future cellular and mobile broadband systems and deliver high quality of experience (QoE) to the consumers, thereby ensuring ubiquitous access to video content and services from any location, at any time, with any device and technology.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 5A illustrates a session description protocol (SDP) offer message that indicates an enhanced far end camera control (FECC) protocol capability based on a real-time transport protocol (RTP) header extension technique in accordance with an example;

FIG. 5B illustrates a session description protocol (SDP) answer message that accepts an enhanced far end camera control (FECC) protocol capability based on a real-time transport protocol (RTP) header extension technique in accordance with an example;

FIG. 6A illustrates a session description protocol (SDP) offer message that indicates an enhanced far end camera control (FECC) protocol capability based on a real-time transport control protocol (RTCP) feedback technique in accordance with an example;

FIG. 6B illustrates a session description protocol (SDP) answer message that accepts an enhanced far end camera control (FECC) protocol capability based on a real-time transport control protocol (RTCP) feedback technique in accordance with an example;

Figure 1:
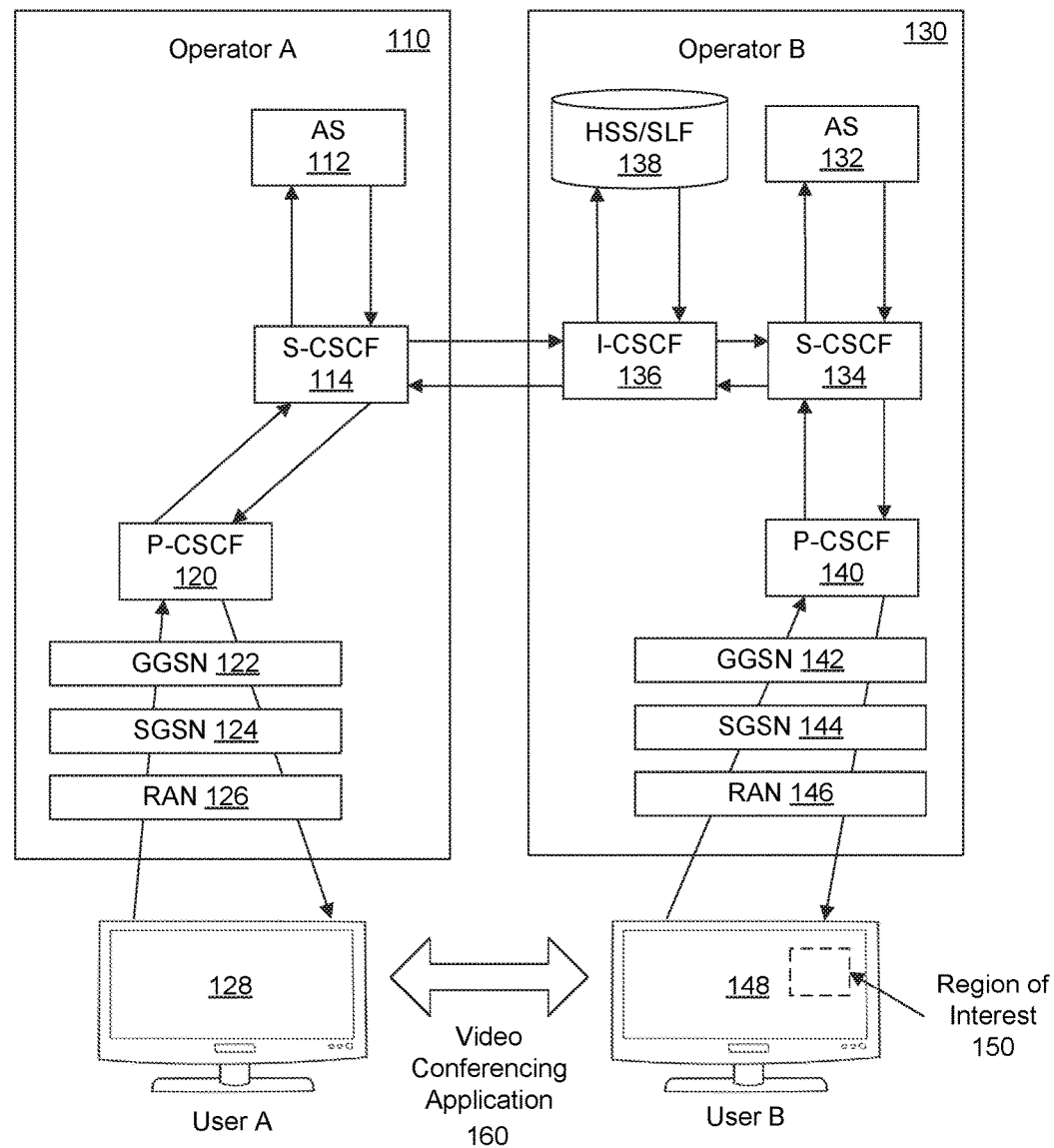
FIG. 1 illustrates a multimedia telephony services over IMS (MTSI)-based video conferencing system that supports a region-of-interest (ROI) zooming feature in accordance with an example.

Reference will now be made to the exemplary embodiments illustrated, and specific language will be used herein to describe the same. It will nevertheless be understood that no limitation of the scope of the invention is thereby intended.

DETAILED DESCRIPTION

Before the present invention is disclosed and described, it is to be understood that this invention is not limited to the particular structures, process steps, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating steps and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

A technology is described for operating a video conferencing application at a local user equipment (UE) that supports an interactive zooming feature. A local user at the local UE can communicate with a remote user at a remote UE by using the video conferencing application. The local user viewing a scene via the video conferencing application on a display screen of the local UE can select an area within the scene. This area can be referred to as a region of interest (ROI) within a field of view at the remote UE. The local user may select the ROI when the local user desires a more detailed representation of contents within the ROI. The local user can dynamically switch from a video feed of the scene to the selected area within the scene (i.e., the ROI) using the interactive zooming feature. The ROI can be mapped to one or more pan, tilt, zoom and focus (PTZF) commands. In other words, the PTZF commands can describe or characterize the ROI selected by the local user at the local UE. The local UE can communicate the PTZF commands to the remote UE via a real-time transport control protocol (RTCP) feedback message, or alternatively, using a real-time transport protocol (RTP) header extension. The remote UE can process the PTZF commands in order to identify the ROI. The remote UE can capture video within the ROI. In addition, the remote UE can encode the video within the ROI. The encoded video can include regions within the ROI and exclude regions outside the ROI. The remote UE can transmit the encoded video to the local UE. The encoded video can include the regions within the ROI at an increased zoom level while substantially maintaining a defined quality level. In other words, the remote UE can provide the encoded video within the ROI in order to enable playback of the encoded video at the local UE. By the remote UE transmitting only the selected area of the scene (i.e., the ROI) to the local UE, and excluding the non-selected area of the scene from transmission, the video conferencing application can more efficiently use the available bandwidth.

There have been a number of multimedia standards that have been developed to enable multimedia to be communicated to, from, or between mobile computing devices. For instance, in streaming video, the third generation partnership project (3GPP) has developed technical specification (TS) 26.234 (e.g. Release 11.0.0) that describes packet-switched streaming services (PSS) that are based on the real-time streaming protocol (RTSP) for unicast streaming of on-demand or live content. In addition, hyper-text transfer protocol (HTTP) based streaming services, including progressive download and dynamic adaptive streaming over HTTP (DASH), are described in 3GPP TS 26.247 (e.g. Release 11.0.0). 3GPP-based multimedia broadcast and multicast services (MBMS) specification TS 26.346 (e.g. Release 11.0.0) specifies streaming and download techniques for multicast/broadcast content distribution. As such, DASH/PSS/MBMS-based mobile computing devices, such as user equipment (UEs), decode and render streamed videos at the UE devices. Support for the 3GP file format in 3GPP TS 26.244 (e.g. Release 11.0.0) is mandated in all of these specifications to support file download and HTTP-based streaming use cases.

One example of a standard for conversational video communication, such as video conferencing, is provided in 3GPP TS 26.114 (e.g. 11.0.0). The standard describes the multimedia telephony services over IMS (MTSI) that allows delivery of advanced multimedia conversational services and content over internet protocol (IP) multimedia subsystems (IMS) based networks. IMS is standardized in 3GPP TS 26.140 (e.g. Rel. 11.0.0). The 3GPP TS 26.140 describes media handling and interaction, which includes media control, media codecs, and the transport of media and control data. The 3GPP TS 26.140 also enables video sharing using multimedia sharing services (MMS), in which support for the 3GP file format is provided.

As described in further detail below, a MTSI call can use call session control function (CSCF) mechanisms to reroute control-plane signaling between the UEs involved in the call (e.g., the video conference application). In the control plane, application servers (AS) can be present and provide supplementary services, such as call hold or resume, call forwarding and multi-party calls, etc.

An MTSI-based transmitter UE terminal can capture and record video, and then transfer the video to an MTSI-based receiver UE terminal over a 3GPP network. The receiver UE terminal can then decode and render the video. In MTSI, the session initiation protocol (SIP) can serve as the application-layer control protocol to establish, modify, and terminate conversational multimedia sessions, such as video conferences, Internet telephony calls, and others. Session description protocol (SDP) based signaling between the sending and receiving terminals can allow for offer/answer considerations in the media-related capability negotiation, including codecs, bitrates, resolutions, etc. The transport of media in MTSI is based on the real-time transport protocol (RTP) (specified by IETF RFC 3550) over UDP/IP.

The resolutions of capture devices, and therefore compressed videos, are rapidly increasing. For example, using the recent High Efficiency Video Coding (HEVC) standard, 4K content can be transported and stored as part of an operational product. Cameras having 4 k-by-2 k resolution are now widely available. Live streaming video has been demonstrated with resolutions of 8 k-by-4 k. Resolutions, in terms of numbers of pixels, are likely to increase in the future. With these very high resolution contents, new usages in video streaming are now possible, such as interactive zooming features.

Conversational video services that are currently present in the marketplace, such as MTSI, enable dynamic adaptation of video in terms of bandwidth, spatial resolution, orientation, etc. However, these conversational video services do not enable users to dynamically switch to a user-selected area in the video being streamed, and optimize encodings for this user-selected area. As a result, the achievable video resolution during the usage of interactive zoom features in video calls can be limited. Although a receiver application can zoom in to the region-of-interest (ROI) and crop out the unwanted parts of the video (e.g., in response to the commands from a user interface), one limitation of current systems is that the sending terminal would still encode and transmit the entire video frame in the absence of any ROI signaling from the receiving terminal.

In one example, signaling of the ROI information from an MTSI receiver to an MTSI sender can enable the MTSI sender to deliver a higher quality stream. The MTSI sender can use a negotiated bitrate entirely or preponderantly on the encoding of the ROI part of the video. To enable this, signaling in both directions can be performed. The MTSI sender can send messages to the MTSI receiver to express capability, and the MTSI receiver can send messages to the MTSI sender to express the desired ROI.

FIG. 1 illustrates an exemplary multimedia telephony services over IMS (MTSI)-based video conferencing system that supports a region-of-interest (ROI) zooming feature. A user (e.g., user A) associated with a remote user equipment (UE) 128 (e.g., a mobile phone, a tablet computer, a desktop computer, or other suitable device) can be video conferencing with another user (e.g., user B) associated with a local UE 148. In other words, both the remote UE 128 and the local UE 148 can be running a two-way video conferencing application 160. The user A can be in proximity to the remote UE 128 (e.g., in front of the remote UE 128) and the user B can be in proximity to the local UE 148 (e.g., in front of the local UE 148). Both the remote UE 128 and the local UE 148 can each include a camera that enables the users to view each other while the video conferencing application 160 is running. The remote UE 128 can include a remote camera and the local UE 148 can include a local camera. The remote UE 128 can include a camera that captures video of user A during operation, and a display screen, which displays video of user B to user A during operation. Similarly, the local UE 148 can include a camera that captures video of user B during operation, and a display screen, which displays video of user A to user B during operation. In other words, user A can view user B via the display screen on the remote UE 128, and user B can view user A via the display screen on the local UE 148.

In one example, the video conferencing application 160 can be over an MTSI-based conversational video system. In other words, the video conferencing application 160 can operate over 3GPP-based multimedia telephony services, which connect the remote UE 128 and the local UE 148 to each other and to the telephone network.

The remote UE 128 can connect to the core network through a radio access network (RAN) 126, a serving general packet radio service (GPRS) support node (SGSN) 124, and/or a gateway GPRS support node (GGSN) 122. The remote UE 128 can send and receive data through a proxy call session control function (P-CSCF) 120. The P-CSCF 120 can send and receive data with a serving call session control function (S-CSCF) 114. In some examples, the S-CSCF 114 can send and receive data from an application server (AS) 122, which can provide supplementary services, such as call hold/resume, call forwarding and multi-party calls, etc. In this example, the RAN 126, the SGSN 124, the GGSN 122, the P-CSCF 120, the S-CSCF 114, and the AS 112 can be associated with an operator A 110. The S-CSCF 114 can send and receive data from other parts of the core network. For example, the S-CSCF 114 that is associated with Operator A 110 can communicate with an interrogating CSCF (I-CSCF) 136 that is associated with an operator B 130.

The local UE 148 can connect to the core network through its own radio access network (RAN) 146, serving general packet radio service (GPRS) support node (SGSN) 144, and gateway GPRS support node (GGSN) 142. The local UE 148 can send and receive data through a proxy call session control function (P-CSCF) 140. The P-CSCF 140 can send and receive data with a serving call session control function (S-CSCF) 134. In some examples, the S-CSCF 134 can send and receive data from an application server (AS) 132, which can provide supplementary services, such as call hold/resume, call forwarding and multi-party calls, etc. The S-CSCF 114 and the S-CSCF 134 can each communicate with an interrogating CSCF (I-CSCF) 136. In other words, operator A 110 can communicate with operator B 130 via communications between the S-CSCF 114 and the I-CSCF 136. The I-CSCF 134 can read and write to a home subscriber server (HSS) 138 and/or a subscriber location function (SLF) 138. In this example, the RAN 146, the SGSN 144, the GGSN 142, the P-CSCF 140, the HSS/SLF 138, the I-CSCF 136, the S-CSCF 134, and the AS 132 can be associated with the operator B 130.

In one configuration, the video conferencing application 160 can support a zooming feature. For example, the local UE 148 can zoom into a particular feature or location in the field of view of the remote camera (i.e., the camera associated with the remote UE 128). At the local UE 148, user B can define a region of interest (ROI) 150 within a field of view at the remote UE 128. As a non-limiting example, at the remote UE 128, the user A may view the user B's head on the display screen of the remote UE 128. At the local UE 148, the user B may view the user A's head and torso on the display screen of the local UE 148. The user B may desire an enhanced view of the user A (e.g., the user B may desire to zoom into user A's face). User B can define the ROI 150 at the local UE 150, such that the ROI 150 includes user A's face. The ROI 150 can be defined at the local UE 150 using, for example, a graphical user interface. In other words, the user B may select the region using an input device, such as a computer mouse or a touch screen. The ROI 150 can include other suitable regions within the field of view of the remote camera. For example, the user B can define the ROI 150 to include user A's torso, a tree behind user A, etc. As other examples, the ROI 150 can include a top right region of the display screen of the local UE 148 (which corresponds to an appropriate field of view of the remote camera), a lower left region of the display screen of the local UE 148, etc.

In one example, the user B can define the ROI 150 to have an arbitrary size and location within the field of view of the remote camera. In another example, the remote UE 128 can remain stationary when the ROI 150 is defined, so that selecting an ROI 150 does not move or change the field of view of the remote camera. In yet another example, the user B can select a new ROI 150 at will. In addition, the user A (at the remote UE 128) can also select an analogous ROI to zoom in on the user B (at the local UE 148).

As explained in further detail below, the ROI 150 can be mapped to one or more pan, tilt, zoom and focus (PTZF) commands. The PTZF commands can characterize or describe the ROI 150 that is selected by the user B. In one example, a series or sequence of PTZF commands can be used to describe the ROI 150. The PTZF commands can be further defined in the H.281/H.224 protocol. The PTZF commands can be an alternative solution to characterizing the ROI 150 as opposed to using specific coordinates. The PTZF commands that describe the ROI 150 can be sent from the local UE 148 to the remote UE 128. As discussed in further detail below, the PTZF commands that describe the ROI 150 can be communicated using a real-time transport control protocol (RTCP) feedback message. In an alternative solution, the PTZF commands that describe the ROI 150 can be embedded in at least one real-time transport protocol (RTP) header extension in captured local video (i.e., video captured at the local UE 148). The RTCP feedback message or the RTP header extension can direct the remote UE 128 to capture video within the ROI 110.

In some examples, the remote UE 128 can capture video that includes only the ROI 150 and excludes regions outside the ROI 150. As a non-limiting example, the RTP header extension or the RTCP feedback message (that includes the PTZF commands that describe the ROI 150) can instruct the remote UE 128 to capture a wound on the user A's chin. In other words, the remote UE's camera can capture only the wound on the user A's chin, and no other regions that surround the user A's chin.

Upon capturing the video in accordance with the ROI 150, the remote UE 128 can encode the video, for example, using an encoding scheme with relatively low compression. Therefore, the video can provide a relatively close-up and detailed view of the ROI 150, while substantially maintaining a defined level of quality. The remote UE 128 can encode the video (with the ROI 150) with the less lossy encoding scheme because the resources that were previously used to encode the entire field of view are now only used to encode the ROI 150. The remote UE 128 can transmit the encoded video (with only the ROI) to the local UE 148. Since the remote UE 128 may consume substantially the same amount of bandwidth when transmitting the encoded video (with only the ROI 150), as opposed to the full field of view of the remote camera (associated with the remote UE 128), the encoded video can be of substantially high quality. In other words, the encoded video of the ROI can be relatively clear and not grainy or blurry. In this regard, the technique described herein is superior to previous technologies where a user (e.g., the user B) manually zooms into the frame displayed on the display screen, which can lead to a reduced quality level. In the current solution, the remote UE 128 can encode only the ROI 150 with a negotiated resolution rather than the whole captured frame, and this would lead to a higher overall resolution and better user experience at the local UE 148.

As a non-limiting example, the remote UE 128 can encode a video of the wound on the user A's chin. The remote UE 128 can use an encoding scheme with relatively low compression, such that the user A's chin is viewable with a relatively large resolution and clarity level. In other words, the encoded video can be a zoomed in representation of the user A's chin, but still maintains a relatively high quality level (e.g., not grainy). In addition, an entire bandwidth can be used for sending the encoded video of the user A's chin, which can result in a relatively clear and detailed representation of the user A's chin. This representation can provide additional details of the user A's face as opposed to if all of the user A's face was included as part of the encoded video.

In an alternative configuration, the remote UE 128 can capture video that includes the full field of view of the remote camera (associated with the remote UE 128). However, the remote UE 108 can only encode a portion of the video that includes the ROI 150. In addition, the remote UE 108 can transmit the encoded video that includes only the ROI 150 and excludes regions outside the ROI 150.

The local UE 148 can receive the encoded video from the remote UE 128, where the encoded video includes regions within the ROI 150 and excludes regions outside the ROI 150. The local UE 148 can render and display the encoded video on the display screen associated with the local UE 148. As a non-limiting example, the user B sitting in front of the local UE 148 can view a detailed and close-up representation of the wound on the user A's chin. The user B can always revert back to a previous view of the user A, e.g., the user B can un-zoom and revert back to viewing the user A's entire face and torso on the display screen of the local UE 148.

The International Telecommunication Union (ITU) Telecommunication Standardization Sector (ITU-T) far-end camera control for real-time transport protocol (RTP) based multimedia service is defined in ITU-T specifications H.224/H.281 and in Internet Engineering Task Force (IETF) Request for Comments (RFC) 4573, using the stack internet protocol (IP)/user datagram protocol (UDP)/RTP/H.224/H.281.

In the far end camera control (FECC) protocol, the indication of a region of interest (ROI) and zooming to a particular ROI can be achieved by the signaling of PTZF— pan, tilt, zoom and focus commands, as standardized by ITU-T H.281. For example, the message format of a START ACTION message can be as follows:

| 8 | 7 | 6 | 5 | 4 | 3 | 2 | 1 |
|---|---|---|---|---|---|---|---|
| START ACTION REQEST | | | | | | | |
| P | R=1 L=0 | T | U=1 D=0 | Z | I=1 O=0 | F | I=1 O=0 |
| | Reserved | | | | Timeout | | |

The START ACTION message can include, for pan (P), a first value for right (R) and a second value for left (L). The START ACTION message can include, for pan (T), a first value for up (U) and a second value for down (D). The START ACTION message can include, for zoom (Z), a first value for in (I) and a second value for out (O). The START ACTION message can include, for focus (F), a first value for in (I) and a second value for out (O).

The FECC protocol relies on ITU-T H.281 over H.224. Therefore, ROI information can be signaled via RTP packets that carry H.224 frames. FECC can be internal to the H.224 frame and can be identified by a client ID field of the H.224 packet. Furthermore, RFC 4573 defines the syntax and the semantics of the Session Description Protocol (SDP) parameters used to support far-end camera control protocol using H.224. The SDP offer/answer can allow negotiating the capability between the two MTSI clients.

In case of 3GPP MTSI, the camera may be fixed to the device (e.g., a tablet or a smartphone) and have no capabilities to actually be controlled independently. For a fixed camera without pan/tilt capabilities, the pan command can be mapped to left/right movements/translations and tilt command can be mapped to up/down movements/translations over the two dimensional (2D) image plane. As such, a combination of PTZ commands can allow for zooming into an arbitrary region-of-interest. These functionalities are called vPTZ (virtual PTZ). The camera motions can be emulated by changing the input buffer of the camera, e.g., when pan or tilt is applied to the full image, no modifications are made. When the camera is zoomed, a smaller rectangular area can be selected, and then the tilt and pan can be accepted by translating the selected rectangle.

In one example, direct usage of the FECC protocol for the purpose of ROI signaling can be disadvantageous from a latency perspective in a mobile communication environment with dynamically varying link characteristics with potentially poor bandwidth. FECC is a progressive protocol that uses continuous transmission of PTZF commands by the receiver (e.g., a local UE at which the user selects the ROI) until the user obtains the stream with the desired ROI. In other words, the sender (e.g., a remote UE at which the encoding occurs) does not have the exact ROI information. In addition, the receiver (e.g., the local UE with a user interface that generates ROI information) does not know the step sizes the sender (e.g., the remote UE) would use in processing the received PTZF commands. The step sizes can indicate a number of pixels of up/down and left/right translation that result from a given P and T command. The step sizes can also indicate an amount of zooming that occurs after transmission of a Z command. These factors of uncertainty can necessitate sending a sequence of PTZF commands using the FECC protocol until the stream with the desired ROI can be received.

As a non-limiting example, the ROI can be described using 13 PTZF commands. In other words, the 13 PTZF commands can describe the ROI selected by the user at the receiver (or local UE). The 13 PTZF commands can be sent from the receiver (e.g., the local UE) to the sender (e.g., the remote UE). In traditional techniques, an amount of time to send the 13 PTZF commands can be based on a round trip time (RTT) and a user interface delay (UI_delay) to issue a new PTZF command. As a non-limiting example, the round trip time can be 300 milliseconds (ms) and the user interface delay can be 100 ms. Therefore, the amount of time to send the 13 PTZF commands (i.e., the latency) can be bounded between 13×UI_delay+RTT (or 1.6 seconds) and 13×RTT (or 3.9 seconds). In other words, the latency when sending the sequence of PTZF commands, in this example, can be in between 1.6 seconds and 3.9 seconds. Therefore, the latency experienced by the user in order to view the stream corresponding to a requested ROI can be as large as 3.9 seconds when using traditional techniques, which can result in a poor user experience.

The novel technology described herein extends a previous FECC protocol, such that a video receiver (e.g., a local UE) can send a grouped sequence of multiple PTZF commands in a single RTP packet (i.e., in a single transmission) to a video sender or a far end terminal (e.g., a remote UE). In an alternative solution, the video receiver can send the grouped sequence of multiple PTZF commands in a single RTCP packet to the video sender. The multiple PTZF commands can be executed in a sequence at the video sender, which allows the video sender to quickly converge to a desired ROI with a back-and-forth exchange of messages. This extended version of the FECC protocol is referred to as enhanced FECC (eFECC). In other words, enhanced FECC support can indicate that the video receiver (e.g., the local UE) is configured to send the sequence of PTZF commands in the single transmission, and that the video sender (e.g., the remote UE) is configured to process the sequence of PTZF commands, identify the ROI based on the PTZF commands, and encode video within the ROI accordingly.

In the previous example, the amount of time to send the 13 PTZF commands can be in between 1.6 seconds and 3.9 seconds when using traditional techniques. By using enhanced FECC, the amount of time to send the same 13 PTZF commands can be reduced. The latency experienced by the user in order to view the stream corresponding to the requested ROI can be determined by UI_delay+RTT. In this example, the UI_delay is 300 ms and the RTT is 100, so therefore, the latency can be 400 ms (or 0.4 seconds). Blind use of the previous FECC protocol in mobile settings can lead to intolerable levels of latency experienced by the user prior to viewing the stream corresponding to the requested ROI. By using the enhanced FECC, the amount of latency can be reduced.

Figure 2:
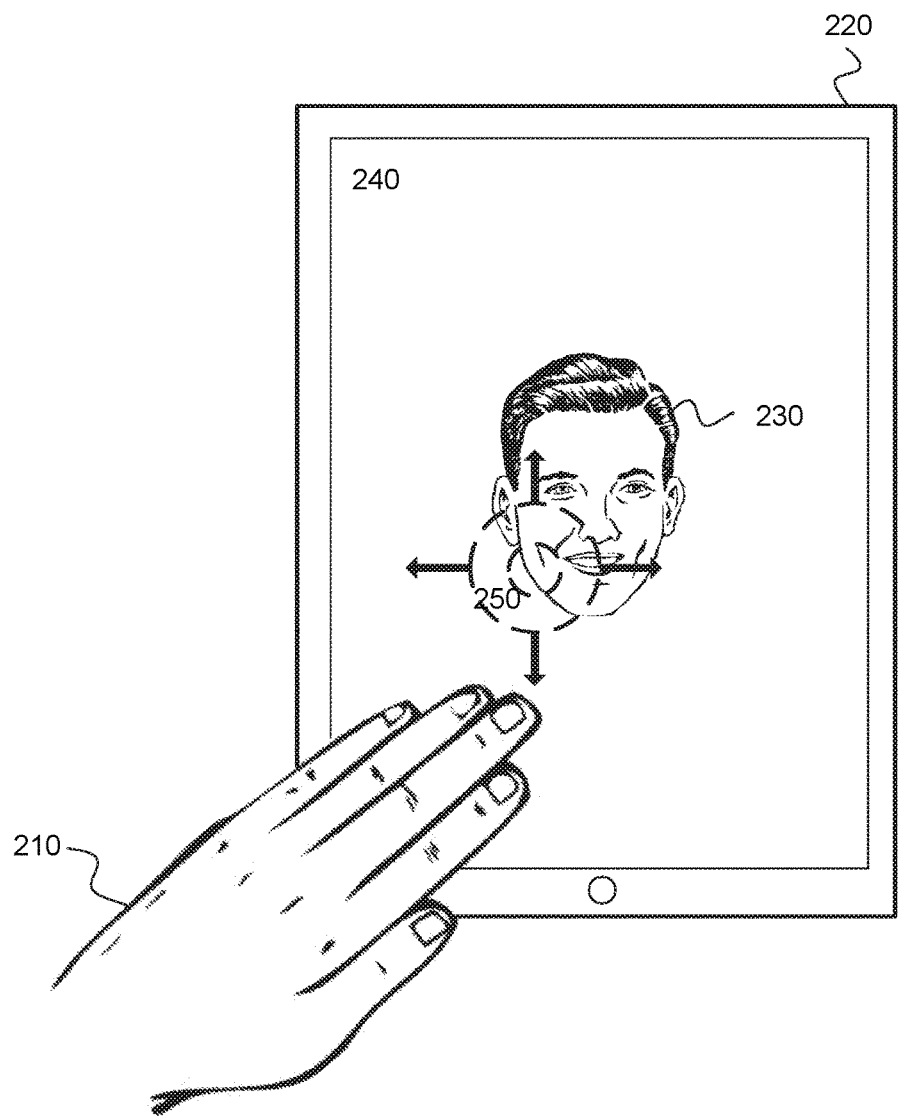
FIG. 2 illustrates a user interface to generate pan, tilt, zoom and focus (PTZF) commands and signal the PTZF commands via a far end camera control (FECC) protocol in accordance with an example.

FIG. 2 illustrates an exemplary user interface 240 to generate pan, tilt, zoom and focus (PTZF) commands and signal the PTZF commands via a far end camera control (FECC) protocol. The user interface 240 can be at a local user equipment (UE) 220. A first user 210 of the local UE 220 can be video conferencing with a second user 230. The second user 230 may be using a remote UE (not shown in FIG. 2) to perform the video conferencing with the first user 210. Therefore, the first user 210 can view the second user 230 via a video conferencing application that is running on the local UE 220. The first user 210 can select a region of interest (ROI) 250 via the user interface 240 on the local UE 220. For example, the first user 210 can select an area of the second user's face. This area that is selected by the first user 210 can indicate the ROI 250. Based on the selection of the ROI 250, the local UE 220 can generate the sequence of PTZF commands. The local UE 220 can send the sequence of PTZF commands to the remote UE. The remote UE can identify the ROI 250 based on the sequence of PTZF commands. The remote UE can only send encoded video that includes the ROI 250. Therefore, the user interface 240 of the local UE 220 can display the ROI 250 in greater detail to the first user 210.

Figure 3:
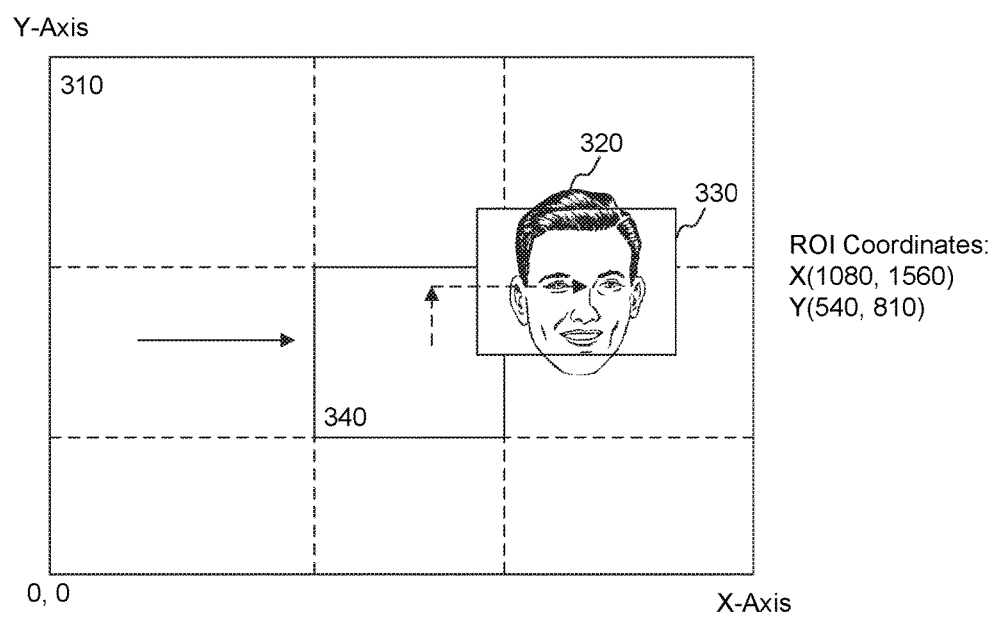
FIG. 3 illustrates a technique for mapping a user-defined region of interest (ROI) to one or more pan, tilt, zoom and focus (PTZF) commands in accordance with an example.

FIG. 3 illustrates an exemplary technique for mapping a user-defined region of interest (ROI) 330 to one or more pan, tilt, zoom and focus (PTZF) commands. A user interface 310 can display a remote user 320. The user interface 310 can be associated with a local user equipment (UE) and the remote user 320 can be associated with a remote UE. In one example, a local user associated with the local UE can be video conferencing with the remote user 320 at 1080p and a negotiated resolution of 1920×1080. The local user of the local UE may wish to zoom into the remote user's face. In other words, the local user of the local UE may want the remote user's face to fill an increased portion of the user interface 310 and with greater detail (i.e., a greater zoom level). In this case, the local user can select a region of interest (ROI) 330 via the user interface 310 on the local UE. For example, the local user can select the ROI 330 to encompass the remote user's face.

As shown in FIG. 3, the user interface 310 can be divided into a selected number of tiles in an X direction and in a Y direction. The user selection of the ROI 330 can be translated into a sequence of PTZF commands that are to be sent from the local UE to the remote UE. In one example, the Z command can result in approximately 90% centered zoom in both X and Y dimensions, which can leave out approximately 10% of the original image from X and Y dimensions. The P command can result in left/right movement across tiles around a center tile 340, and a quarter x-tile-size of a step with each P command. The T command can result in up/down movement across tiles around the center tile 340, and a quarter y-tile-size of a step with each T command.

As shown in FIG. 3, the user defined ROI 330 can be associated with X coordinates of (1080, 1560) and Y coordinates of (540, 810). A lower left hand corner of the user interface 310 can be an origin with X and Y coordinates of (0,0). In order to represent the ROI 330 using the sequence of PTZF commands, at least eight zoom commands (as shown by the solid arrow in FIG. 3) can be used to obtain the center tile 340. The eight zoom commands can be used to obtain the center tile 340 after zooming with the X-Y coordinates of X(720, 1200) and Y (405, 675), and the corresponding center tile 340 has dimensions of 480×270. In other words, the center tile 340 has an X-tile size of 480 pixels and a Y-tile size of 270 pixels. In addition, at least two commands in the upward direction and at least three commands in the rightward direction can be used in order to obtain the ROI 330 (as illustrated by the dashed arrows in FIG. 3). Therefore, a total of 13 PTZF commands can be used to describe or characterize the ROI 330. The PTZF commands can be sent from the local UE to the remote UE. The remote UE can identify the ROI 330 based on the PTZF commands, and provide video within the ROI 330 accordingly to the local UE.

Figure 4:
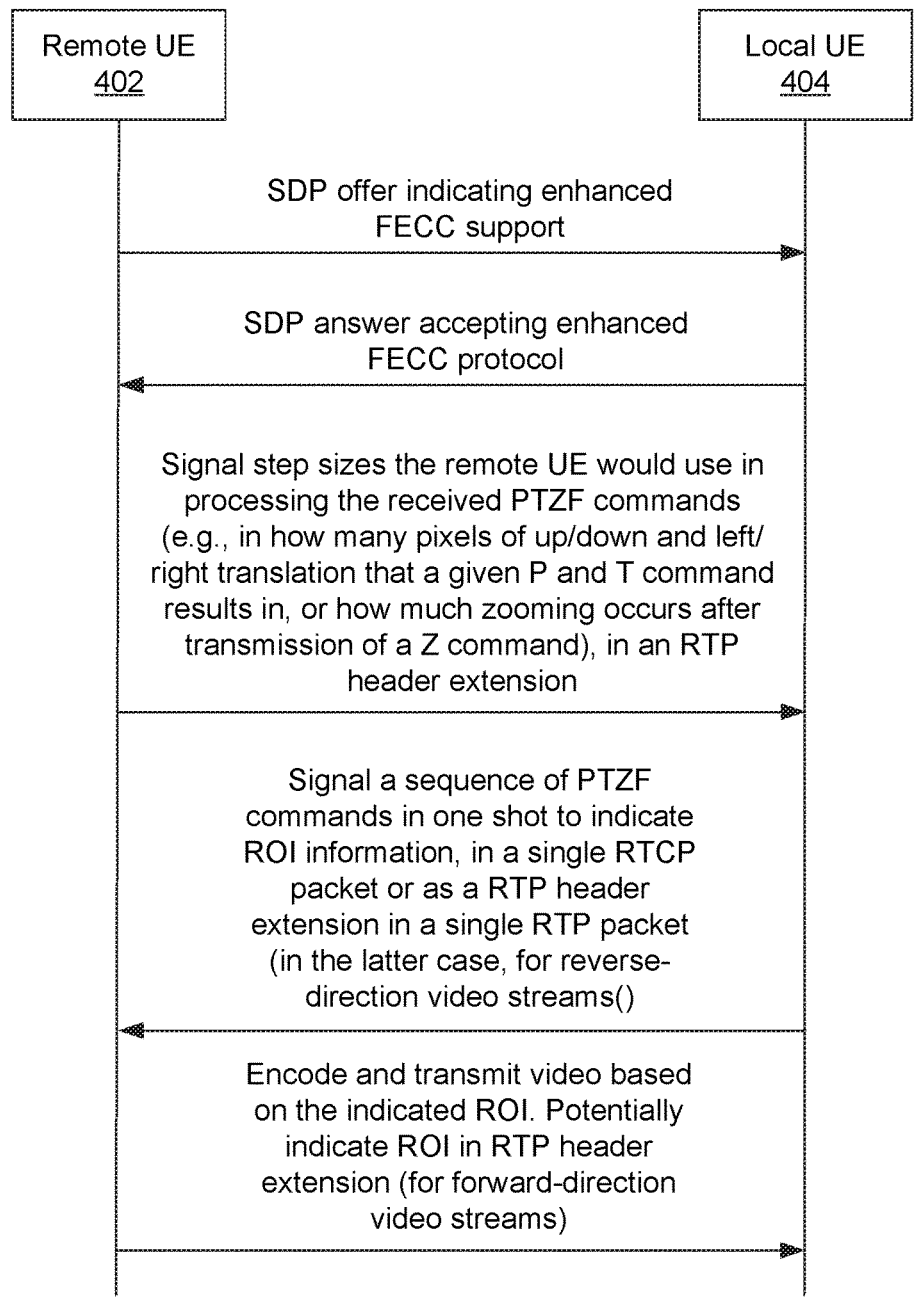
FIG. 4 is a flow diagram illustrating communications between a remote user equipment (UE) and a local UE for initiating a region-of-interest (ROI) zooming feature in a multimedia telephony services over IMS (MTSI)-based video conferencing application in accordance with an example.

FIG. 4 is an exemplary flow diagram illustrating communications between a remote user equipment (UE) 402 and a local UE 404 for initiating a region-of-interest (ROI) zooming feature in a multimedia telephony services over IMS (MTSI)-based video conferencing application. In one example, the remote UE 402 can be referred to as a sending client and the local UE 404 can be referred to as a receiving client. The remote UE 402 and the local UE 404 can each run a video conferencing application that allows a remote user associated with the remote UE 402 to communicate with a local user associated with the local UE 404.

Session description protocol (SDP)-based signaling between the remote UE 402 and the local UE 404 can allow for offer/answer considerations in the media-related capability negotiation for enhanced far end camera control (FECC) protocol support. The enhanced FECC protocol support can indicate an ability of the local UE 404 (or receiver) to send a grouped sequence of pan, tilt, zoom and focus (PTZF) commands using the H.281/H.224 FECC protocol in a single real-time transport control protocol (RTCP) feedback message and/or in a single real-time transport protocol (RTP) packet using RTP header extension mechanisms. In addition, the enhanced FECC protocol support can indicate an ability of the remote UE 402 (or sender) to process the sequence of PTZF commands, identify a region of interest (ROI) based on the PTZF commands, and encode video within the ROI accordingly.

The remote UE 402 can send an SDP offer message to the local UE 404. The SDP offer message can indicate that the remote UE 404 supports the enhanced FECC protocol, as described earlier. The local UE 404 can receive the SDP offer message from the remote UE 402, and in response, send an SDP answer message that accepts the enhanced FECC protocol capability.

In one configuration, the remote UE 402 can send step sizes to the local UE 404. In other words, the step sizes can be included in signaling from the remote UE 404 and the local UE 404. The local UE 404 does not initially know the step sizes that the remote UE 402 will use in processing received PTZF commands. Therefore, the remote UE 402 can send the step sizes to the local UE 404. The remote UE 402 can send the step sizes as dedicated RTP header extension attributes. The step sizes can indicate a number of pixels of up/down and left/right translation that result from a given P and T command. The step sizes can also indicate an amount of zooming that occurs after transmission of a Z command. As a result, the local UE 404 can determine how the PTZF commands will be processed at the remote UE 402, and the local UE 404 can accordingly select the PTZF commands.

The local UE 404 can derive a sequence of PTZF commands based on the step sizes previously received from the remote UE 402. The PTZF commands can correspond to a user-defined region of interest (ROI). In other words, the ROI can be defined by the local user of the local UE 404. The local UE 404 can signal the sequence of PTZF commands to the remote UE 402. In one configuration, the sequence of PTZF commands can be sent from the local UE 404 to the remote UE 402 in a single transmission. In other words, the PTZF commands can be grouped together and sent to the remote UE 402 at the same time. For example, the sequence of PTZF commands can be sent in a single RTCP packet. Alternatively, the sequence of PTZF commands can be sent as a RTP header extension in a single RTP packet. The local UE 404 can communicate the sequence of PTZF commands to the remote UE 402 using the RTP header extension for reverse-direction video streams.

The remote UE 402 can receive the sequence of PTZF commands from the local UE 404. The remote UE 402 can identify the ROI based on the sequence of PTZF commands. Since the PTZF commands are grouped together in the single transmission, the remote UE 402 can quickly process the PTZF commands and deliver the stream corresponding to a desired ROI with low latency. The remote UE 402 can capture video that includes only the ROI and excludes regions outside the ROI. The remote UE 402 can encode the video that includes only the ROI. The remote UE 402 can send the encoded video to the local UE 404. In one example, the remote UE 402 can also indicate an actual transmitted ROI in an RTP header extension for forward-direction video streams. The local UE 404 can receive the encoded video that includes the ROI and play the video at the local UE 404.

When the PTZF commands (e.g., ROI information) are signaled from the local UE 404 to the remote UE 402 using the RTP header extension message, an MTSI client that supports the enhanced FECC feature (as described earlier) can offer enhanced FECC in SDP messages for all media streams containing video. The enhanced FECC can be offered by including the a=extmap attribute indicating the enhanced FECC uniform resource name (URN) under the relevant media line scope. For instance, the enhanced FECC URN can be set as: urn:3gpp:efecc. An example of a media line that includes this URN is: a=extmap:7 urn:3gpp:efecc. In the above example of a media line, the number 7 can be replaced with any number in the range of 1 and 14.

When the PTZF commands (e.g., ROI information) are signaled from the local UE 404 to the remote UE 402 using the RTCP message, an MTSI client that supports the enhanced FECC feature can offer eFECC in SDP messages for all media streams containing video. The enhanced FECC feature can be offered by including the a=rtcp-fb attribute with a novel eFECC type under the relevant media line scope. For instance, the eFECC type in conjunction with the RTCP feedback technique can be expressed with the following parameter: 3gpp:efecc. A wildcard payload type ("*") can be used to indicate that the RTCP feedback attribute enhanced FECC applies to all payload types. If several types of ROI feedback are supported and/or the same ROI feedback is to be specified for a subset of the payload types, then several "a=rtcp-fb" lines can be used. An example usage of this attribute to signal eFECC relative to a media line based on the RTCP feedback technique is: a=rtcp-fb:*3gpp-efecc.

The RTCP feedback technique can involve signaling of the PTZF commands (e.g., ROI information) in both of the immediate feedback and early RTCP modes. The novel RTCP feedback type for eFECC can include: a value name of 3gpp-efecc, a long name of Enhanced Far End Camera Control, and a reference of Third Generation Partnership Project (3GPP) Technical Specification (TS) 26.114.

The enhanced FECC capability can be supported bi-directionally or uni-directionally depending on how clients negotiate to support the feature during SDP capability negotiations. For terminals with asymmetric capability (e.g. the ability to process PTZF commands or ROI information but not detect/signal ROI information), the "sendonly" and "recvonly" attributes can be used. Terminals are to express their capability in each direction in a manner that is sufficiently clear, such that signals are only sent in each direction to the extent that they both express useful information and can be processed by the recipient.

The enhanced FECC feature can include signaling of the current ROI of a receiving user (that is associated with the remote UE 402) in a sequence of PTZF commands. The signaling of the PTZF commands can be in accordance with the H.281/H.224 protocol. The PTZF commands can be sent to the remote UE 402 (e.g., the sender), such that the remote UE 402 can optimally encode and transmit the captured video within the ROI. When enhanced FECC is successfully negotiated, it can be signaled by the MTSI client. The signaling of the sequence of PTZF commands can occur in a grouped manner over a single RTCP message or a single RTP packet using RTP header extensions.

When using RTCP feedback messages, the local UE 404 (i.e., the receiving terminal) can include the sequence of PTZF commands corresponding to the current ROI information of the receiving user in the RTCP feedback message that is being transmitted to the remote UE 402 (i.e., the sending terminal). When using RTP header extensions, the local UE 404 (i.e., the receiving terminal) can include the sequence of PTZF commands corresponding to the current ROI information of the receiving user in the RTP packets that are being transmitted to the remote UE 402 (i.e., the sending terminal). These RTP packets can carry video streams in the reverse direction, which can be used for bi-directional video communications in MTSI.

FIG. 5A illustrates an exemplary session description protocol (SDP) offer message. The SDP offer message can be communicated from a remote user equipment (UE) to a local UE. The SDP offer message can be based on a real-time transport protocol (RTP) header extension technique. The SDP offer message can indicate an enhanced far end camera control (FECC) protocol capability at the remote UE. In particular, the enhanced FECC protocol capability can indicate the remote UE's capability of processing a sequence of pan, tilt, zoom and focus (PTZF) commands received from the local UE, identifying a region of interest (ROI) from the sequence of PTZF commands and encoding video within the ROI accordingly. As an example, the SDP offer message can include an attribute of "a=extmap" and an associated value of "4 urn:3gpp:efecc".

FIG. 5B illustrates an exemplary session description protocol (SDP) answer message. The SDP answer message can be communicated from a local user equipment (UE) to a remote UE. The SDP answer message can be based on a real-time transport protocol (RTP) header extension technique. The SDP answer message can accept an enhanced far end camera control (FECC) protocol capability of the remote UE. As an example, the SDP answer message can include an attribute of "a=extmap" and an associated value of "4 urn:3gpp:efecc".

FIG. 6A illustrates an exemplary session description protocol (SDP) offer message. The SDP offer message can be communicated from a remote user equipment (UE) to a local UE. The SDP offer message can be based on a real-time transport control protocol (RTCP) feedback technique. The SDP offer message can indicate an enhanced far end camera control (FECC) protocol capability at the remote UE. In particular, the enhanced FECC protocol capability can indicate the remote UE's capability of processing a sequence of pan, tilt, zoom and focus (PTZF) commands received from the local UE, identifying a region of interest (ROI) from the sequence of PTZF commands and encoding video within the ROI accordingly. As an example, the SDP offer message can include an attribute of "a=rtcp-fb" and an associated value of "3gpp:efecc".

FIG. 6B illustrates an exemplary session description protocol (SDP) answer message. The SDP answer message can be communicated from a local user equipment (UE) to a remote UE. The SDP answer message can be based on a real-time transport control protocol (RTCP) feedback technique. The SDP answer message can accept an enhanced far end camera control (FECC) protocol capability of the remote UE. As an example, the SDP answer message can include an attribute of "a=extmap" and an associated value of "4 urn:3gpp:efecc".

Figure 7:
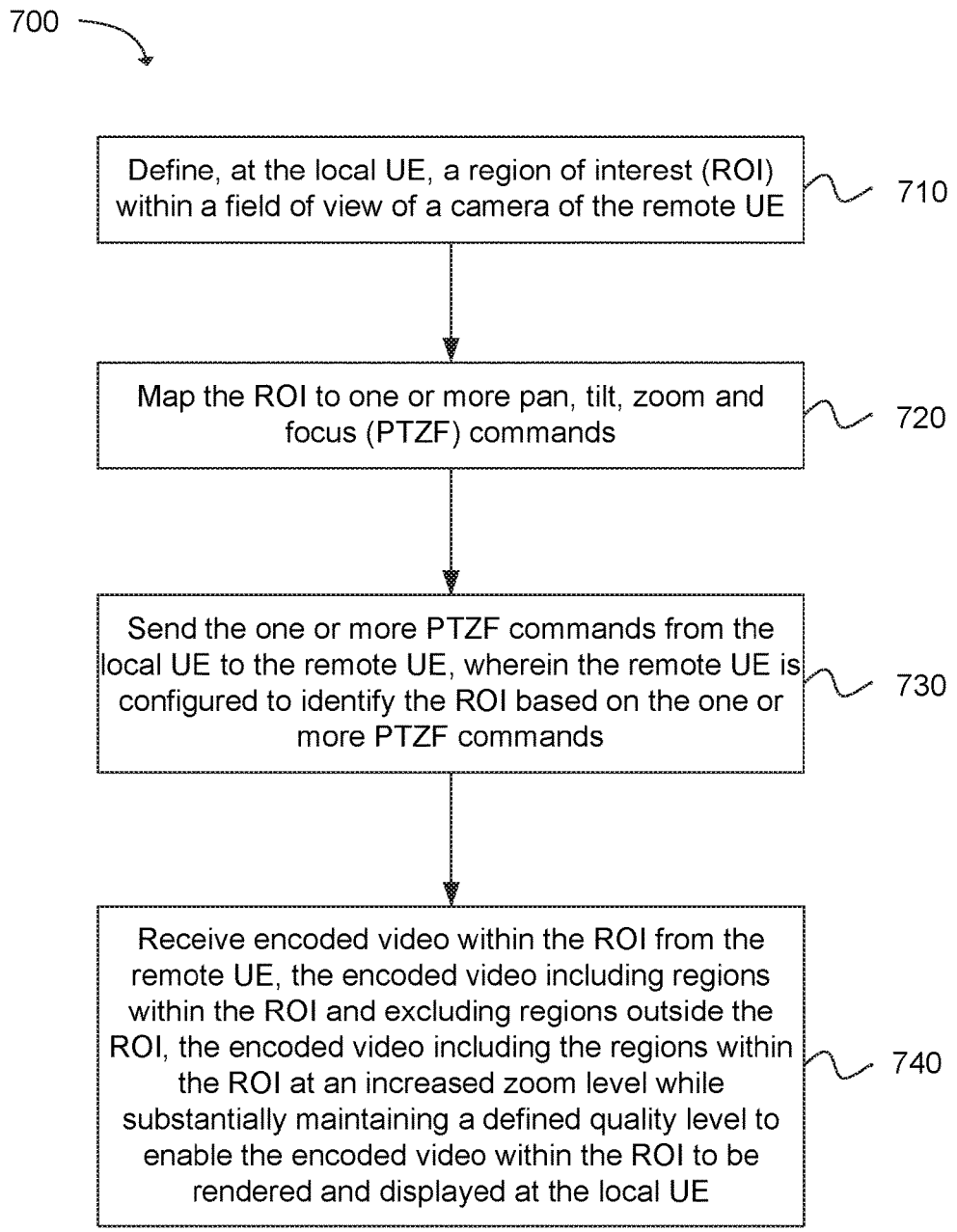
FIG. 7 depicts functionality of a local user equipment (UE) operable to perform video conferencing with a remote UE in accordance with an example.

Another example provides functionality 700 of a local user equipment (UE) operable to perform video conferencing with a remote UE, as shown in the flow chart in FIG. 7. The functionality can be implemented as a method or the functionality can be executed as instructions on a machine, where the instructions are included on at least one computer readable medium or one non-transitory machine readable storage medium. The local UE can have one or more processors configured to define, at the local UE, a region of interest (ROI) within a field of view of a camera of the remote UE, as in block 710. The one or more processors can be configured to map the ROI to one or more pan, tilt, zoom and focus (PTZF) commands, as in block 720. The one or more processors can be configured to send the one or more PTZF commands from the local UE to the remote UE, wherein the remote UE is configured to identify the ROI based on the one or more PTZF commands, as in block 730. The one or more processors can be configured to receive encoded video within the ROI from the remote UE, the encoded video including regions within the ROI and excluding regions outside the ROI, the encoded video including the regions within the ROI at an increased zoom level while substantially maintaining a defined quality level to enable the encoded video within the ROI to be rendered and displayed at the local UE, as in block 740.

In one configuration, a first processor can perform the operations in blocks 710 and 720. The first processor can be a single processor, or alternatively, the first processor can be comprised of one or more separate processors. In one configuration, a second processor can perform the operations in blocks 730 and 740. One example of the second processor is a baseband processor.

In one example, the one or more PTZF commands are in accordance with an International Telecommunication Union (ITU) H.281/H.224 protocol. In another example, the one or more processors are configured to send the one or more PTZF commands to the remote UE in a single transmission. In yet another example, the ROI is selected by a user interacting with the local UE. In addition, the one or more processors are configured to send the one or more PTZF commands to the remote UE using a real-time transport control protocol (RTCP) feedback message.

In one example, the one or more processors are configured to: embed the one or more PTZF commands in at least one real-time transport protocol (RTP) header extension; and send captured local video to the remote UE, the captured local video including the RTP header extension with the one or more PTZF commands. In another example, the one or more processors are further configured to receive one or more step sizes, from the remote UE, that are used at the remote UE to process the one or more PTZF commands sent from the local UE.

In one example, the one or more step sizes are signaled as dedicated real-time transport protocol (RTP) header extension attributes. In another example, the encoded video is captured using a fixed non-moving camera of the remote UE. In yet another example, one or more PTZF commands are sent to the remote UE in accordance with a far end camera control (FECC) protocol. In addition, the one or more processors are further configured to receive a session description protocol (SDP) offer message from the remote UE indicating that the remote UE supports an enhanced far end camera control (FECC) protocol for receiving the one or more PTZF commands.

In one example, the one or more processors are further configured to send a session description protocol (SDP) answer message acknowledging that the local UE supports an enhanced far end camera control (FECC) protocol for sending the one or more PTZF commands. In another example, the one or more processors are configured to send the one or more PTZF commands to the remote UE, wherein the remote UE is configured to capture video within the ROI that corresponds to the one or more PTZF commands and only encodes the video within the ROI. In yet another example, the one or more processors are further configured to operate a video conferencing application with the remote UE that supports a ROI-based interactive zooming feature.

Figure 8:
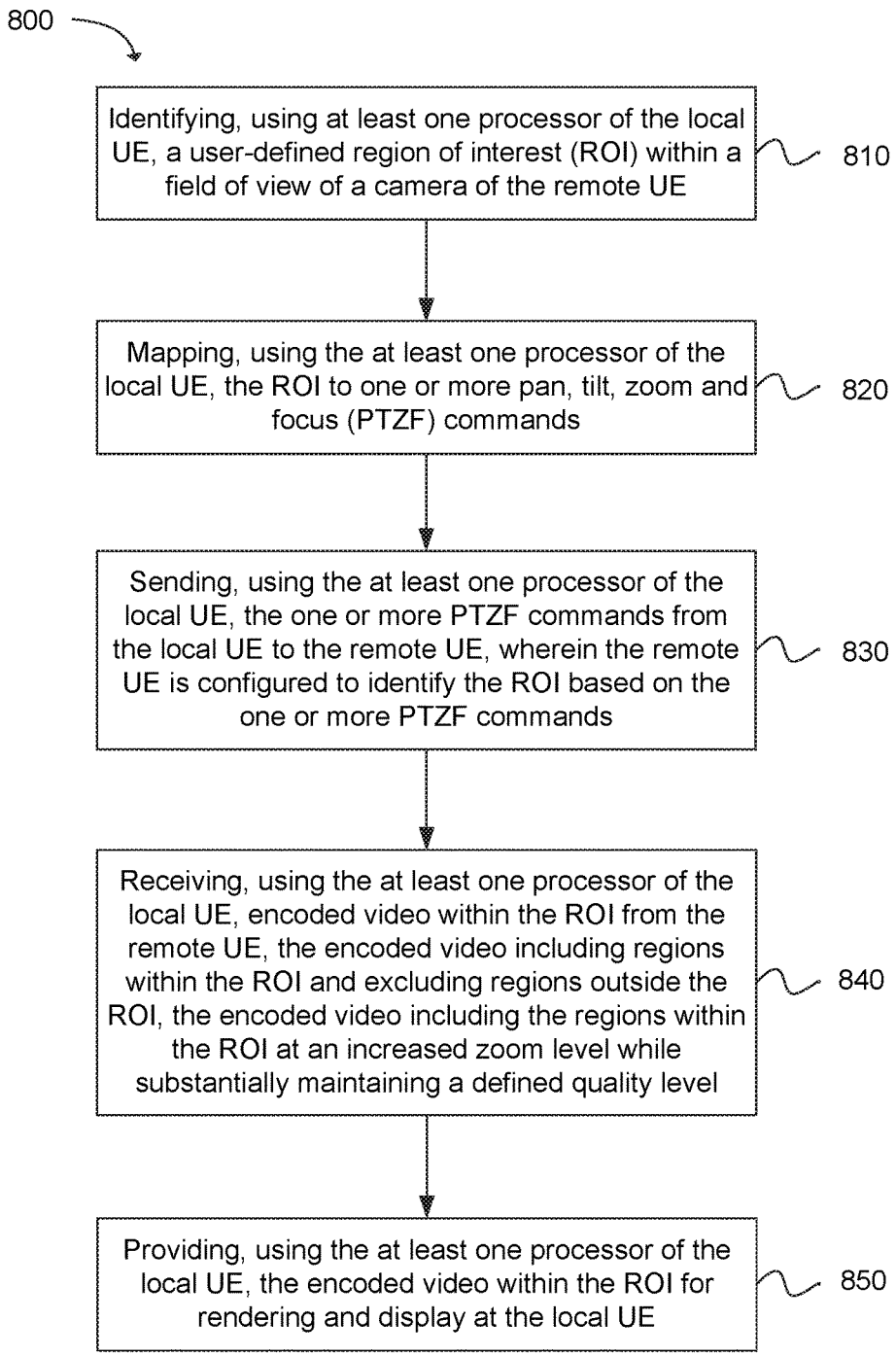
FIG. 8 depicts a flow chart of at least one non-transitory machine readable storage medium having instructions embodied thereon for operating a video conferencing application at a local user equipment (UE) that supports an interactive zooming feature in accordance with an example.

Another example, illustrated in the flow chart of FIG. 8, provides functionality 800 of at least one non-transitory machine readable storage medium having instructions embodied thereon for operating a video conferencing application at a local user equipment (UE) that supports an interactive zooming feature. The instructions, when executed, can cause the local UE to perform identifying, using at least one processor of the local UE, a user-defined region of interest (ROI) within a field of view of a camera of the remote UE, as in block 810. The instructions, when executed, can cause the local UE to perform mapping, using the at least one processor of the local UE, the ROI to one or more pan, tilt, zoom and focus (PTZF) commands, as in block 820. The instructions, when executed, can cause the local UE to perform sending, using the at least one processor of the local UE, the one or more PTZF commands from the local UE to the remote UE, wherein the remote UE is configured to identify the ROI based on the one or more PTZF commands, as in block 830. The instructions, when executed, can cause the local UE to perform receiving, using the at least one processor of the local UE, encoded video within the ROI from the remote UE, the encoded video including regions within the ROI and excluding regions outside the ROI, the encoded video including the regions within the ROI at an increased zoom level while substantially maintaining a defined quality level, as in block 840. The instructions, when executed, can cause the local UE to perform providing, using the at least one processor of the local UE, the encoded video within the ROI for rendering and display at the local UE, as in block 850.

In one example, the one or more PTZF commands are in accordance with an International Telecommunication Union (ITU) H.281/H.224 protocol. In another example, the at least one non-transitory machine readable storage can further comprise instructions which when executed by the at least one processor of the local UE, cause the local UE to perform sending the one or more PTZF commands to the remote UE in a single transmission. In yet another example, the at least one non-transitory machine readable storage can further comprise instructions which when executed by the at least one processor of the local UE, cause the local UE to perform sending the one or more PTZF commands to the remote UE using a real-time transport control protocol (RTCP) feedback message.

In one example, the at least one non-transitory machine readable storage can further comprise instructions which when executed by the at least one processor of the local UE, cause the local UE to perform: embedding the one or more PTZF commands in at least one real-time transport protocol (RTP) header extension; and sending captured local video to the remote UE, the captured local video including the RTP header extension with the one or more PTZF commands. In another example, the at least one non-transitory machine readable storage can further comprise instructions which when executed by the at least one processor of the local UE, cause the local UE to perform receiving one or more step sizes, from the remote UE, that are used at the remote UE to process the one or more PTZF commands sent from the local UE, wherein the one or more step sizes are signaled as dedicated real-time transport protocol (RTP) header extension attributes. In addition, the one or more PTZF commands are sent to the remote UE in accordance with a far end camera control (FECC) protocol.

Figure 9:
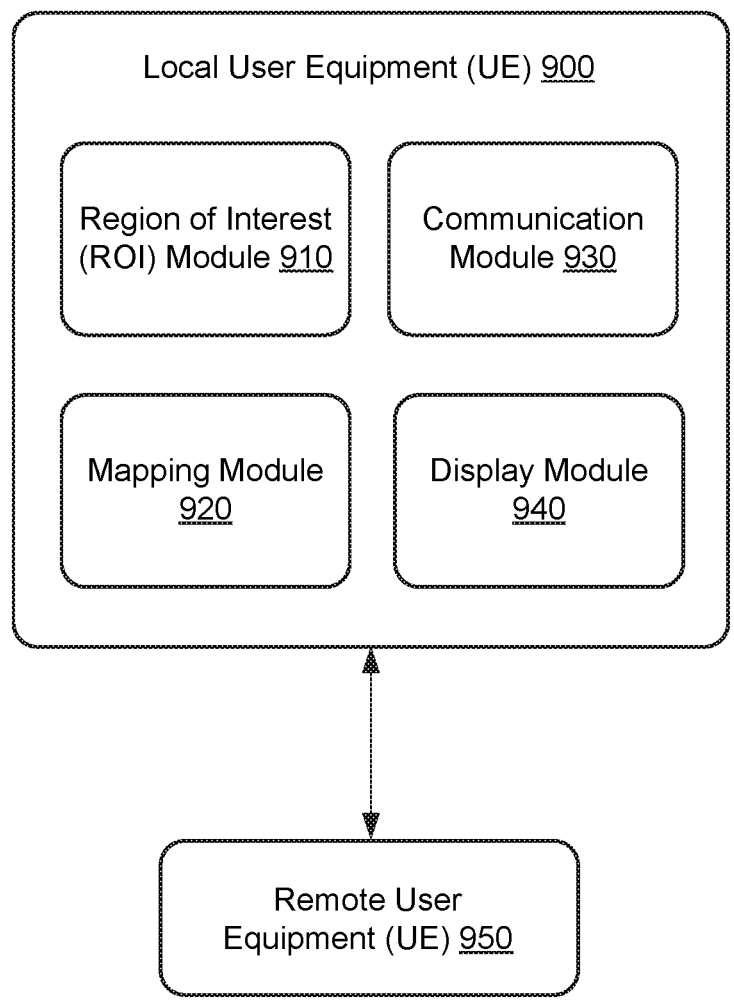
FIG. 9 depicts functionality of a local user equipment (UE) operable to perform video conferencing with a remote UE in accordance with an example.

Another example provides functionality of a local user equipment (UE) 900 operable to perform video conferencing with a remote UE 950, as shown in the flow chart in FIG. 9. The local UE 900 can include a region of interest (ROI) module 910 configured to identify a user-defined ROI within a field of view of a camera of the remote UE 950. The local UE 900 can include a mapping module 920 configured to map the ROI to one or more pan, tilt, zoom and focus (PTZF) commands, the one or more PTZF commands being defined in accordance with an International Telecommunication Union (ITU) H.281/H.224 protocol. The local UE 900 can include a communication module 930 configured to: send the one or more PTZF commands from the local UE to the remote UE 950 in a single transmission, wherein the remote UE is configured to identify the ROI based on the one or more PTZF commands; and receive encoded video within the ROI from the remote UE, the encoded video including regions within the ROI and excluding regions outside the ROI, the encoded video including the regions within the ROI at an increased zoom level while substantially maintaining a defined quality level. The local UE 900 can include a display module 940 configured to provide the encoded video within the ROI for rendering and display at the local UE.

In one example, the communication module 930 can be further configured to: receive a session description protocol (SDP) offer message from the remote UE 950 indicating that the remote UE supports an enhanced far end camera control (FECC) protocol for receiving the one or more PTZF commands; and send a session description protocol (SDP) answer message acknowledging that the local UE supports an enhanced far end camera control (FECC) protocol for sending the one or more PTZF commands.

In one example, the communication module 930 can be further configured to send the one or more PTZF commands to the remote UE 950, wherein the remote UE is configured to capture video within the ROI that corresponds to the one or more PTZF commands and only encodes the video within the ROI. In another example, the communication module 930 can be further configured to send the one or more PTZF commands to the remote UE using a real-time transport control protocol (RTCP) feedback message.

Figure 10:
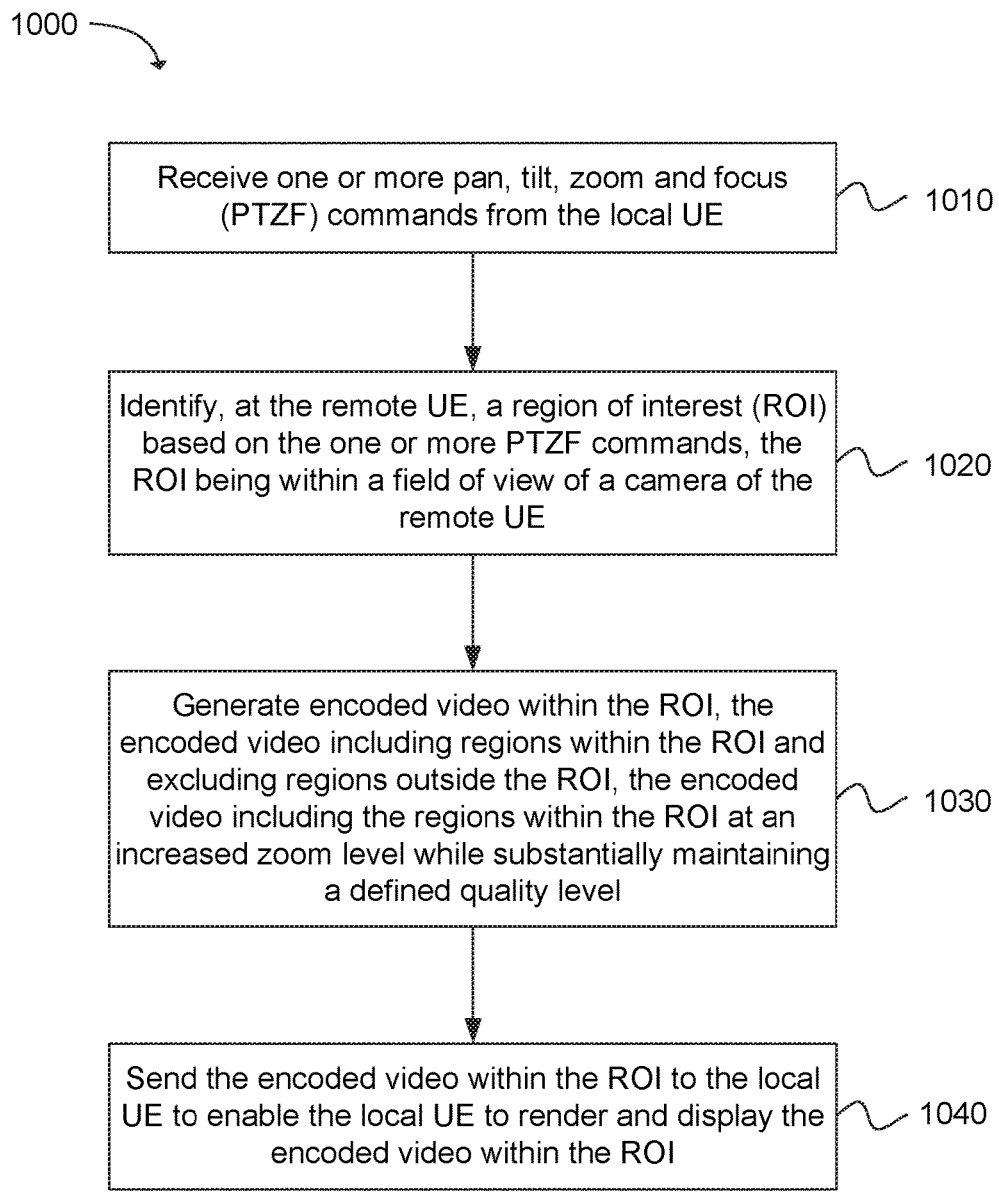
FIG. 10 depicts functionality of a remote user equipment (UE) operable to perform video conferencing with a local UE in accordance with an example.

Another example provides functionality 1000 of a remote user equipment (UE) operable to perform video conferencing with a local UE, as shown in the flow chart in FIG. 10. The functionality can be implemented as a method or the functionality can be executed as instructions on a machine, where the instructions are included on at least one computer readable medium or one non-transitory machine readable storage medium. The remote UE can have one or more processors configured to receive one or more pan, tilt, zoom and focus (PTZF) commands from the local UE, as in block 1010. The one or more processors can be configured to identify, at the remote UE, a region of interest (ROI) based on the one or more PTZF commands, the ROI being within a field of view of a camera of the remote UE, as in block 1020. The one or more processors can be configured to generate encoded video within the ROI, the encoded video including regions within the ROI and excluding regions outside the ROI, the encoded video including the regions within the ROI at an increased zoom level while substantially maintaining a defined quality level, as in block 1030. The one or more processors can be configured to send the encoded video within the ROI to the local UE to enable the local UE to render and display the encoded video within the ROI, as in block 1040.

In one configuration, a first processor can perform the operations in blocks 1010, 1020 and 1030. The first processor can be a single processor, or alternatively, the first processor can be comprised of one or more separate processors. In one configuration, a second processor can perform the operation in block 1040. One example of the second processor is a baseband processor.

In one example, the one or more PTZF commands are in accordance with an International Telecommunication Union (ITU) H.281/H.224 protocol. In another example, the one or more processors are configured to receive the one or more PTZF commands from the local UE in a single transmission. In yet another example, the one or more processors are configured to receive the one or more PTZF commands from the local UE using a real-time transport control protocol (RTCP) feedback message. In addition, the one or more processors are further configured to send one or more step sizes to the local UE, the step sizes being used at the remote UE to process the one or more PTZF commands, wherein the one or more step sizes are signaled as dedicated real-time transport protocol (RTP) header extension attributes.

Figure 11:
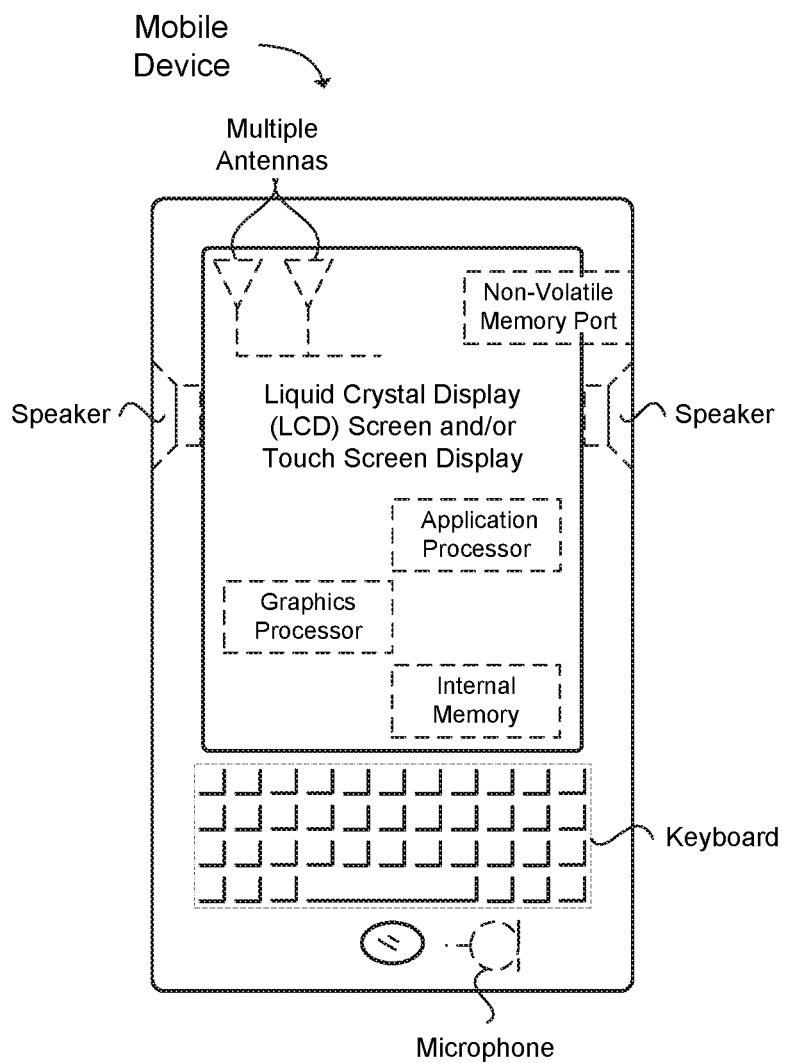
FIG. 11 illustrates a diagram of a wireless device (e.g., UE) in accordance with an example.

FIG. 11 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node or transmission station, such as a base station (BS), an evolved Node B (eNB), a baseband unit (BBU), a remote radio head (RRH), a remote radio equipment (RRE), a relay station (RS), a radio equipment (RE), a remote radio unit (RRU), a central processing module (CPM), or other type of wireless wide area network (WWAN) access point. The wireless device can be configured to communicate using at least one wireless communication standard including 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN.

FIG. 11 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Various techniques, or certain aspects or portions thereof, can take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. Circuitry can include hardware, firmware, program code, executable code, computer instructions, and/or software. A non-transitory computer readable storage medium can be a computer readable storage medium that does not include signal. In the case of program code execution on programmable computers, the computing device can include a processor, a storage medium readable by the processor (including volatile and non-volatile memory and/or storage elements), at least one input device, and at least one output device. The volatile and non-volatile memory and/or storage elements can be a random-access memory (RAM), erasable programmable read only memory (EPROM), flash drive, optical drive, magnetic hard drive, solid state drive, or other medium for storing electronic data. The node and wireless device can also include a transceiver module (i.e., transceiver), a counter module (i.e., counter), a processing module (i.e., processor), and/or a clock module (i.e., clock) or timer module (i.e., timer). One or more programs that can implement or utilize the various techniques described herein can use an application programming interface (API), reusable controls, and the like. Such programs can be implemented in a high level procedural or object oriented programming language to communicate with a computer system. However, the program(s) can be implemented in assembly or machine language, if desired. In any case, the language can be a compiled or interpreted language, and combined with hardware implementations.

As used herein, the term processor can include general purpose processors, specialized processors such as VLSI, FPGAs, or other types of specialized processors, as well as base band processors used in transceivers to send, receive, and process wireless communications.

It should be understood that many of the functional units described in this specification have been labeled as modules, in order to more particularly emphasize their implementation independence. For example, a module can be implemented as a hardware circuit comprising custom very-large-scale integration (VLSI) circuits or gate arrays, off-the-shelf semiconductors such as logic chips, transistors, or other discrete components. A module can also be implemented in programmable hardware devices such as field programmable gate arrays, programmable array logic, programmable logic devices or the like.

In one example, multiple hardware circuits or multiple processors can be used to implement the functional units described in this specification. For example, a first hardware circuit or a first processor can be used to perform processing operations and a second hardware circuit or a second processor (e.g., a transceiver) can be used to communicate with other entities. The first hardware circuit and the second hardware circuit can be integrated into a single hardware circuit, or alternatively, the first hardware circuit and the second hardware circuit can be separate hardware circuits.

Modules can also be implemented in software for execution by various types of processors. An identified module of executable code can, for instance, comprise one or more physical or logical blocks of computer instructions, which can, for instance, be organized as an object, procedure, or function. Nevertheless, the executables of an identified module need not be physically located together, but can comprise disparate instructions stored in different locations which, when joined logically together, comprise the module and achieve the stated purpose for the module.

Indeed, a module of executable code can be a single instruction, or many instructions, and can even be distributed over several different code segments, among different programs, and across several memory devices. Similarly, operational data can be identified and illustrated herein within modules, and can be embodied in any suitable form and organized within any suitable type of data structure. The operational data can be collected as a single data set, or can be distributed over different locations including over different storage devices, and can exist, at least partially, merely as electronic signals on a system or network. The modules can be passive or active, including agents operable to perform desired functions.

Reference throughout this specification to "an example" or "exemplary" means that a particular feature, structure, or characteristic described in connection with the example is included in at least one embodiment of the present invention. Thus, appearances of the phrases "in an example" or the word "exemplary" in various places throughout this specification are not necessarily all referring to the same embodiment.

As used herein, a plurality of items, structural elements, compositional elements, and/or materials can be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention can be referred to herein along with alternatives for the various components thereof. It is understood that such embodiments, examples, and alternatives are not to be construed as defacto equivalents of one another, but are to be considered as separate and autonomous representations of the present invention.

Furthermore, the described features, structures, or characteristics can be combined in any suitable manner in one or more embodiments. In the following description, numerous specific details are provided, such as examples of layouts, distances, network examples, etc., to provide a thorough understanding of embodiments of the invention. One skilled in the relevant art will recognize, however, that the invention can be practiced without one or more of the specific details, or with other methods, components, layouts, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

What is claimed is:

1. An apparatus of a multimedia telephony services over internet protocol (IP) multimedia subsystems (IMS) (MTSI) receiver operable to support region of interest (ROI) signaling with a MTSI sender, the apparatus comprising one or more processors and memory configured to:
define, at the MTSI receiver, a requested region of interest (ROI)
map, at the MTSI receiver, the requested ROI to one or more pan, tilt, zoom and focus (PTZF) commands;
store, in the memory, the one or more PTZF commands that are mapped to the requested ROI;
signal the one or more PTZF commands representing the requested ROI for transmission to the MTSI sender via real-time transport protocol (RTP) packets, wherein the requested ROI is identified at the MTSI sender based on the one or more PTZF commands; and
decode, at the MTSI receiver, encoded video received from the MTSI sender, wherein the encoded video is within the requested ROI.

2. The apparatus of claim 1, further comprising a transceiver configured to:
transmit the one or more PTZF commands to the MTSI sender via the RTP packets; and
receive the encoded video from the MTSI sender.

3. The apparatus of claim 1, wherein the one or more PTZF commands are in accordance with an International Telecommunication Union (ITU) H.281 protocol that supports camera movements for pan, tilt, zoom and focus (PTZF).

4. The apparatus of claim 1, wherein:
a pan command is mapped to left or right movements or translations over an image plane when the MTSI sender includes a fixed non-moving camera; or
a tilt command is mapped to up or down movements or translations over the image plane when the MTSI sender includes the fixed non-moving camera.

5. The apparatus of claim 1, wherein the one or more PTZF commands are signaled to the MTSI sender in accordance with a far end camera control (FECC) protocol.

6. The apparatus of claim 1, wherein the one or more PTZF commands are signaled to the MTSI sender for transmission via the RTP packets that carry H.224 frames using a stack internet protocol (IP)/user datagram protocol (UDP)/RTP/H.224/H.281.

7. The apparatus of claim 1, wherein the one or more PTZF commands enables the MTSI receiver to zoom into an arbitrary ROI.

8. At least one non-transitory machine readable storage medium having instructions embodied thereon for operating a video conferencing application at a local client that supports an interactive zooming feature, the instructions when executed by one or more processors cause the local client to perform the following:
defining a region of interest (ROI) within a field of view of a camera associated with a remote client;
mapping the ROI to one or more pan, tilt, zoom and focus (PTZF) commands;
processing the one or more PTZF commands for transmission from the local UE client to the remote client via real-time transport protocol (RTP) packets, wherein the ROI is identified at the remote client based on the one or more PTZF commands;
decoding encoded video within the ROI received from the remote client, the encoded video including regions within the ROI and excluding regions outside the ROI; and
providing the encoded video within the ROI for rendering and display at the local client.

9. The at least one non-transitory machine readable storage medium of claim 8, wherein the one or more PTZF commands are in accordance with an International Telecommunication Union (ITU) H.281/H.224 protocol.

10. The at least one non-transitory machine readable storage medium of claim 8, further comprising instructions which when executed by the one or more processors cause the local client to perform the following: processing the one or more PTZF commands for delivery to the remote client in a single transmission.

11. The at least one non-transitory machine readable storage medium of claim 8, further comprising instructions which when executed by the one or more processors cause the local client to perform the following: defining the ROI based on a received user input.

12. The at least one non-transitory machine readable storage medium of claim 8, wherein the one or more PTZF commands are sent to the remote client in accordance with a far end camera control (FECC) protocol.

13. The at least one non-transitory machine readable storage medium of claim 8, further comprising instructions which when executed by the one or more processors cause the local client to perform the following: defining the ROI based on a user selection provided to the local client.

14. The at least one non-transitory machine readable storage medium of claim 8, further comprising instructions which when executed by the one or more processors cause the local client to perform the following: operate a video conferencing application with the remote client that supports a ROI-based interactive zooming feature.

15. An apparatus of a remote user equipment (UE) operable to perform video conferencing with a local UE, the apparatus comprising one or more processors configured to:

process, at the remote UE, one or more pan, tilt, zoom and focus (PTZF) commands received from the local UE via real-time transport protocol (RTP) packets;

identify, at the remote UE, a region of interest (ROI) based on the one or more PTZF commands, the ROI being within a field of view of a camera of the remote UE;

encode video within the ROI, the encoded video including regions within the ROI and excluding regions outside the ROI; and process, at the remote UE, the encoded video within the ROI for transmission to the local UE.

16. The apparatus of claim 15, further comprising memory configured to store the one or more PTZF commands and the ROI that corresponds to the one or more PTZF commands.

17. The apparatus of claim 15, wherein the one or more PTZF commands are in accordance with an International Telecommunication Union (ITU) H.281/H.224 protocol.

18. The apparatus of claim 15, wherein the one or more processors are configured to process the one or more PTZF commands received from the local UE in a single transmission.

19. The apparatus of claim 15, further comprising a fixed non-moving camera configured to capture the encoded video within the ROI, wherein a pan command is mapped to left or right movements or translations over an image plane when the remote UE includes the fixed non-moving camera, or a tilt command is mapped to up or down movements or translations over the image plane when the remote UE includes the fixed non-moving camera.

20. The apparatus of claim 15, wherein the one or more PTZF commands are received from the local UE in accordance with a far end camera control (FECC) protocol.

* * * * *